Figures 1, 2:
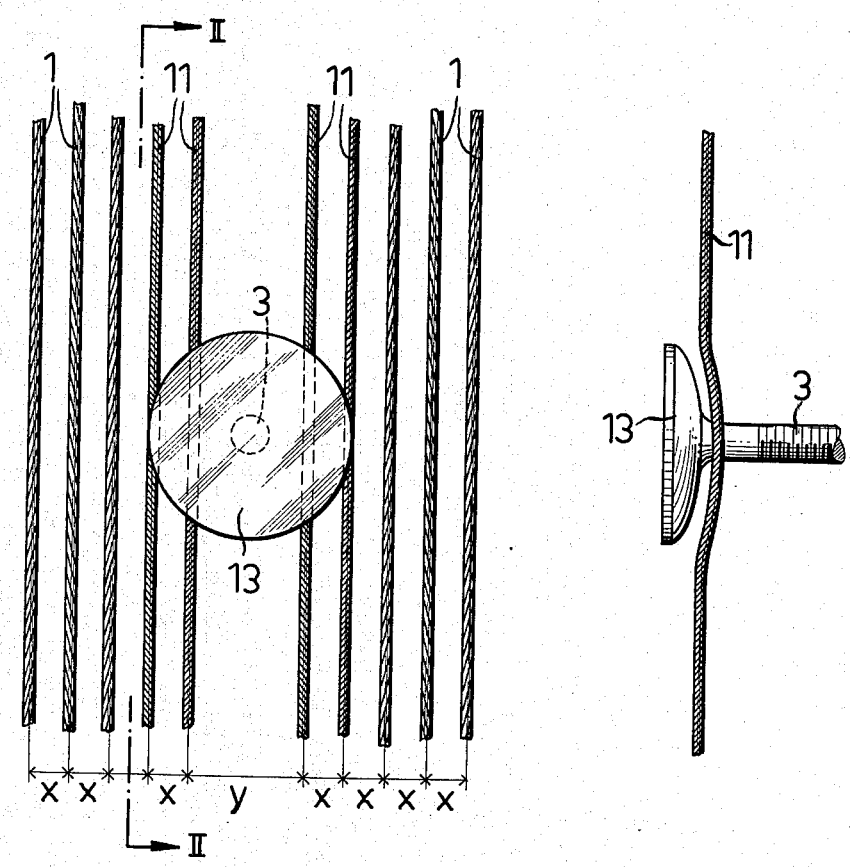

United States Patent [19]
Zintarra et al.

[11] 4,280,617
[45] Jul. 28, 1981

[54] CONVEYOR BELT

[75] Inventors: Helmut Zintarra, Hanover; Olaf Klüpfel, Ahlen-Vorhelm, both of Fed. Rep. of Germany

[73] Assignee: Continental Gummi-Werke Aktiengesellschaft, Hanover, Fed. Rep. of Germany

[21] Appl. No.: 46,504

[22] Filed: Jun. 7, 1979

[30] Foreign Application Priority Data

Jun. 10, 1978 [DE] Fed. Rep. of Germany ....... 2825609

[51] Int. Cl.³ ...................... B65G 15/44; B65G 15/34
[52] U.S. Cl. ..................................... 198/699; 198/847
[58] Field of Search ............... 198/699, 711, 847, 648

[56] References Cited
U.S. PATENT DOCUMENTS

| 3,335,843 | 8/1967 | Duvivier et al. | 198/847 |
| 3,670,870 | 6/1972 | Cheek | 198/711 |
| 3,831,358 | 8/1974 | Marsh | 198/711 |

FOREIGN PATENT DOCUMENTS 2533091 1/1977 Fed. Rep. of Germany .
1547594 6/1979 United Kingdom .

Primary Examiner—Jeffrey V. Nase
Assistant Examiner—Brian Bond
Attorney, Agent, or Firm—Becker & Becker, Inc.

[57] ABSTRACT

Conveyor belt of rubber or rubber-like elastomeric synthetic materials with strength members embedded in the belt and arranged in mutually spaced apart relationship while extending parallel to each other in the longitudinal direction of the belt, whereby the strength members are generally distributed in groups over the width of the belt at predetermined intervals. The strength members can be in the form of wires, cables, ropes and the like, while the conveyor belt includes carrier elements such as cups, baffle plates, rakes or scrapers, or pusher dogs, and the like.

5 Claims, 2 Drawing Figures

CONVEYOR BELT

The present invention relates to conveyor belts of rubber or rubber-like elastomeric synthetic materials with strength members embedded in said belt, and arranged in mutually spaced apart relationship while extending parallel to each other in the longitudinal direction of the belt, whereby the strength members are generally distributed in groups over the width of the belt at predetermined intervals. The strength members can be in the form of wires, cables, ropes and the like, while the belts comprise carrier elements such as cups, baffle plates, rakes or scrapers, or pusher dogs and the like on their upper surfaces, positioned on and secured to the belt body.

According to current production techniques, such conveyor belts permit in a simple manner a durable and lasting connection of the mounted carrier elements without appreciable limitation of their tensile strength since the bores for the required securement elements, such as cap screws, threaded studs, and the like, can be provided without difficulties in that region of the belt which is free of strength members between groupwise distributed, continuously extending strength members.

In usage of such belts, for example when used with bucket conveyors or bucket elevators, it has been observed, however, that on tightening of the screws and due to local densification of the elastomeric material of the belt, the pertaining adjacent strength members are moved out of their straight-linear, stretched axial-direction and are, accordingly, subjected to an increased initial stress or tension, relative to the strength members which are not affected. While the degree of deformation is comparatively low, it is multiplied, however, over the total length of the belt by the number of the securement locations which are present, with the result that, in the final analysis, considerable overstrain or overloading of individual strength members can occur, this leading to a premature damage or to disruptions of belt feeding.

It is an object of the present invention to maintain a uniform distribution of stress or tension over the width of the belt.

This object and other objects and advantages of the invention will appear more clearly from the following specification in connection with the accompanying drawings, in which:

FIG. 1 is a diagrammatical top plan view of an arrangement of two adjacent wire rope groups in a conveyor belt; and FIG. 2 is a cross section along the line II—II of FIG. 1.

The conveyor belt according to the present invention is characterized primarily thereby that predetermined strength members which are arranged so as to receive therebetween the pertaining carrier elements are adapted to exhibit a greater elastic elongation or elasticity, than the other strength members in the pertaining group.

When using wire ropes as strength members, which exhibit the higher expansion values, these can be of comparable construction and diameter as the regularly spaced wire ropes, but they will have a shorter length of lay or twist.

According to another embodiment of the invention, the higher expansion values, instead, can also be ensured by wire ropes having a structure and/or diameter which differs from the regularly spaced strength members. The combination, in accordance with the invention, of two different types of rope in a single belt construction provides the opportunity for the wire ropes in the fringe zones of the individual wire rope groups and immediately adjacent the fastening or attachment elements or members to yield to the deformations to which they are subjected without essential increase of their pretensioning. The otherwise unavoidable overloading is thus prevented; and, due to the at least nearly uniform cooperative association of all pertaining wire ropes in responding to the pertaining forces during conveying, an important requirement for maintaining the belt in operative condition is satisfied. Such an objective is even more so attained, in accordance with another embodiment of the invention, when the strength members which are not adjacent the carrier elements are embedded with a high initial pretensioning or preloading, in comparison to the strength members having a higher elongation or elasticity, already during the manufacture of the conveyor belts.

The number of the reinforced strength members which are capable of increased elongation or elastic yielding, will depend on the pertaining conditions, the type, and the dimensions of the fastening or attachment elements which are used, and the region which are acted upon by the heads of the screws, by the washers, and the like. In any case, at least the pertaining outer, i.e. the lateral ropes which are immediately adjacent the strength members and border a pertaining group are affected. In another embodiment, the invention contemplates that the strength members which are covered, when viewed in plan, by the fastening or attachment elements of the carrier elements are formed so as to have a higher elastic elongation or expansion capability.

Referring now particularly to the drawings, it is noted that these only indicate the positioning and arrangement of the strength members and an exemplary carrier element, whereby the actual belt body has not been shown.

The strength members, provided by longitudinally extending steel wire ropes or reinforcing strands 1, are arranged plane parallel to each other within groups in which they are evenly spaced apart at a distance designated x. The uniformity of this division is varied by leaving out two or more wire ropes to provide between the groups of narrowly spaced ropes a larger distance designated y. The thus provided free space of the belt body, not shown, is continuously perforated and utilized for mounting of fastening or attachment screws 3. Pertaining heads 13 of the attachment screws 3 rest directly on the upper surface of the belt body, not shown, and are positively pressed thereagainst by means of nuts, also not shown.

The lateral or outer ropes 11 of each rope group and which are covered, according to the top plan view of FIG. 1, by the head 13 of an attachment screw 3, are formed to exhibit a higher elastic elongation or elasticity, in comparison to the other wire ropes which are not affected by the head 13 of an attachment screw 3, so that as is indicated in FIG. 2, they are adapted to follow the localized deflection without essential increase of their preloading. With otherwise like dimensions, the differing elongation behavior relative to the wire ropes 1 can, for example be attained by producing these with a shorter length of lay or twist, as is indicated by a different crosshatching in the drawing.

The present invention is, of course, in no way restricted to the specific disclosure of the specification and drawings, but also encompasses any modification within the scope of the appended claims.

What we claim is:

1. A conveyor belt, which conveyor belt comprises in combination:

a belt body of elastomeric material, said belt body including at least two groups of continuous reinforcing strands embedded in and extending longitudinally with respect to said belt body, said reinforcing strands being pretensioned and being spaced from and parallel to one another, each group of reinforcing strands being spaced apart a predetermined distance from the adjacent group of reinforcing strands to provide a zone in the belt body free of reinforcing strands, those reinforcing strands of each group positioned adjacent to said zone having a greater elasticity than the reinforcing strands not adjacent said zone, and means for securing attachments to the belt body, said securing means passing through said zones and extending only over the reinforcing strands of greater elasticity whereby the reinforcing strands of greater elasticity deform relative to the other strands to accomodate the shape of the securing means.

2. A conveyor belt according to claim 1 wherein said reinforcing strands are made of metal.

3. The conveyor belt according to claim 2 wherein the reinforcing strands are cables formed of twisted wire and wherein the reinforcing strands of greater elasticity have a shorter length of twist than the other reinforcing strands.

4. The conveyor belt according to claim 3 wherein the reinforcing strands of greater elasticity are embedded in said belt with a lower pretension than the other reinforcing strands.

5. The conveyor belt according to claim 1 wherein the securing means are spaced studs having heads, said heads extending only over the reinforcing strands of greater elasticity.

* * * * *

UNITED STATES PATENT AND TRADEMARK OFFICE
CERTIFICATE OF CORRECTION

PATENT NO. : 4,280,617

DATED : 28 July 1981

INVENTOR(S) : Helmut Zintarra et al

It is certified that error appears in the above—identified patent and that said Letters Patent is hereby corrected as shown below:

On the Title-Abstract Page:

(73) Assignees: Continental Gummi-Werke Aktiengesellschaft Hanover, Fed. Rep. of Germany; and Beumer Maschinenfabrik KG, Fed. Rep. of Germany, a part interest.

Signed and Sealed this

Third Day of November 1981

[SEAL]

Attest:

GERALD J. MOSSINGHOFF

Attesting Officer

Commissioner of Patents and Trademarks